United States Patent
Kasuya et al.

(10) Patent No.: US 8,448,541 B2
(45) Date of Patent: May 28, 2013

(54) HYBRID DRIVE SPEED CHANGE DEVICE

(75) Inventors: Satoru Kasuya, Nishio (JP); Hiroshi Katou, Kariya (JP); Masashi Kitou, Anjo (JP); Takayoshi Kato, Handa (JP); Yuichi Seki, Okazaki (JP)

(73) Assignee: Aisin Aw Co., Ltd., Anjo (JP)

( * ) Notice: Subject to any disclaimer, the term of this patent is extended or adjusted under 35 U.S.C. 154(b) by 0 days.

(21) Appl. No.: 13/137,284

(22) Filed: Aug. 3, 2011

(65) Prior Publication Data

US 2012/0090425 A1 Apr. 19, 2012

Related U.S. Application Data

(63) Continuation of application No. PCT/JP2011/052863, filed on Feb. 10, 2011.

(30) Foreign Application Priority Data

Mar. 31, 2010 (JP) .................................. 2010-081513

(51) Int. Cl.
*F16H 37/06* (2006.01)
*B60K 6/48* (2007.10)

(52) U.S. Cl.
USPC ........................................ 74/661; 180/65.245

(58) Field of Classification Search
USPC .. 74/665 A, 661; 475/5; 903/902; 180/65.245
See application file for complete search history.

(56) References Cited

U.S. PATENT DOCUMENTS

| | | | |
|---|---|---|---|
| 5,427,196 A * | 6/1995 | Yamaguchi et al. | 180/65.21 |
| 6,258,001 B1 * | 7/2001 | Wakuta et al. | 475/5 |
| 6,373,155 B1 * | 4/2002 | Shimizu et al. | 310/68 B |
| 7,975,571 B2 * | 7/2011 | Sanji | 74/661 |
| 2004/0045752 A1 * | 3/2004 | Omote et al. | 180/65.2 |
| 2005/0035675 A1 * | 2/2005 | Yamaguchi et al. | 310/68 R |
| 2005/0079942 A1 | 4/2005 | Bauknecht et al. | |
| 2008/0093135 A1 * | 4/2008 | Nomura et al. | 180/65.2 |
| 2009/0100965 A1 | 4/2009 | Sanji et al. | |
| 2009/0105040 A1 * | 4/2009 | Sanji | 477/5 |
| 2010/0109461 A1 * | 5/2010 | Kato et al. | 310/90 |
| 2011/0121692 A1 * | 5/2011 | Iwase et al. | 310/67 R |
| 2011/0240431 A1 * | 10/2011 | Iwase et al. | 192/3.29 |

FOREIGN PATENT DOCUMENTS

| | | |
|---|---|---|
| JP | A-2003-063261 | 3/2003 |
| JP | A-2004-001708 | 3/2003 |

(Continued)

OTHER PUBLICATIONS

May 17, 2011 Search Report issued in PCT/JP2011/052863 (with translation).

*Primary Examiner* — Troy Chambers
*Assistant Examiner* — Jude Agendia
(74) *Attorney, Agent, or Firm* — Oliff & Berridge, PLC

(57) ABSTRACT

To provide a hybrid drive speed change device in which a rotation sensor can be disposed appropriately from the viewpoint of reducing the axial dimension of the device. A rotary electric machine MG is disposed coaxially with an input shaft M, and includes a stator St and a rotor Ro provided radially inwardly of the stator St. An oil pump 18 includes a pump case 90, 91 in which a pump chamber 18$a$ is formed, and a pump rotor 18$b$ rotatably housed in the pump chamber 18$a$. The pump rotor 18$b$ is disposed coaxially with the input shaft M. A rotation sensor 19 is disposed radially outwardly of the pump chamber 18$a$ and radially inwardly of the stator St of the rotary electric machine MG, and disposed to overlap the oil pump 18 as seen from the radial direction of the input shaft M.

8 Claims, 5 Drawing Sheets

FOREIGN PATENT DOCUMENTS

| | | |
|---|---|---|
| JP | A-2004-215393 | 7/2004 |
| JP | A-2005-112351 | 4/2005 |
| JP | A-2009-101730 | 5/2009 |
| WO | WO 2006/054661 A1 | 5/2006 |

* cited by examiner

HYBRID DRIVE SPEED CHANGE DEVICE

INCORPORATION BY REFERENCE

The disclosure of Japanese Patent Application No. 2010-081513 filed on Mar. 31, 2010, and PCT Patent Application No. PCT/JP2011/052863 filed on Feb. 10, 2011 including the specification, drawings and abstract is incorporated herein by reference in its entirety.

BACKGROUND OF THE INVENTION

The present invention relates to a hybrid drive speed change device including a friction engagement device having an input-side member drivably coupled to an internal combustion engine, an output-side member drivably coupled to a speed change mechanism, and an engagement mechanism that selectively drivably couples the input-side member and the output-side member to each other, the hybrid drive speed change device further including a rotary electric machine having a rotor drivably coupled to the output-side member, a rotation sensor that detects the rotational angle of the rotor, an oil pump, the speed change mechanism, and an input shaft serving as a shaft that drivably couples the speed change mechanism and the output-side member to each other.

DESCRIPTION OF THE RELATED ART

A device disclosed in Japanese Patent Application Publication No. JP-A-2004-1708 (FIGS. 6 and 8 etc.) mentioned below is already known as an example of the hybrid drive speed change device described above. In the hybrid drive speed change device according to JP-A-2004-1708, as shown in FIGS. 6 and 8 etc. of JP-A-2004-1708, a starting clutch 23 (friction engagement device) is disposed to overlap a motor generator 2 (rotary electric machine) as seen from the radial direction. This makes it possible to reduce the axial dimension of the hybrid drive speed change device.

SUMMARY OF THE INVENTION

In order to reduce the axial dimension of the hybrid drive speed change device, it is desirable to appropriately dispose a rotation sensor that detects the rotational angle of a rotor of the rotary electric machine. However, JP-A-2004-1708 mentioned above does not describe the installation position of a resolver (rotation sensor) from the viewpoint of reducing the axial dimension of the hybrid drive speed change device, and there has not been revealed how the rotation sensor should be arranged from the viewpoint of reducing the axial dimension of the device.

In view of the foregoing, it is desirable to provide a hybrid drive speed change device in which a rotation sensor can be disposed appropriately from the viewpoint of reducing the axial dimension of the device.

A hybrid drive speed change device according to a first aspect of the present invention includes: a friction engagement device having an input-side member drivably coupled to an internal combustion engine, an output-side member drivably coupled to a speed change mechanism, and an engagement mechanism that selectively drivably couples the input-side member and the output-side member to each other; a rotary electric machine having a rotor drivably coupled to the output-side member; a rotation sensor that detects a rotational angle of the rotor; an oil pump; the speed change mechanism; and an input shaft serving as a shaft that drivably couples the speed change mechanism and the output-side member to each other. In the hybrid drive speed change device, the rotary electric machine is disposed coaxially with the input shaft, and includes a stator and the rotor provided radially inwardly of the stator; the oil pump includes a pump case in which a pump chamber is formed, and a pump rotor rotatably housed in the pump chamber; the pump rotor is disposed coaxially with the input shaft; and the rotation sensor is disposed radially outwardly of the pump chamber and radially inwardly of the stator of the rotary electric machine, and disposed to overlap the oil pump as seen from a radial direction of the input shaft.

According to the first aspect, the rotation sensor is disposed to overlap the oil pump as seen from the radial direction of the input shaft. Therefore, the axial length of the space occupied by the rotation sensor and the oil pump can be reduced to be short compared to a case where the rotation sensor and the oil pump are disposed side by side in the axial direction without overlapping each other as seen from the radial direction of the input shaft.

According to the above first aspect, in addition, the rotation sensor is disposed radially outwardly of the pump chamber and radially inwardly of the stator of the rotary electric machine. That is, the rotation sensor is disposed not to overlap the stator, which is a component of the rotary electric machine that tends to be large in the axial direction, as seen from the axial direction. This facilitates reducing the axial length of the space occupied by the rotation sensor and the stator to be short. By adopting such an arrangement, further, it is possible to cause the rotation sensor and the stator to approach each other in the axial direction or overlap each other as seen from the radial direction, while securing an appropriate distance between the rotation sensor and the stator, in order to suppress the detection error of the rotation sensor due to electromagnetic noise generated from the stator.

Thus, according to the above first aspect, the axial length of the space occupied by the rotation sensor, the oil pump, and the stator can be reduced, which allows the rotation sensor to be disposed appropriately from the viewpoint of reducing the axial dimension of the hybrid drive speed change device.

Here, according to a second aspect of the present invention, the rotation sensor may be disposed to overlap the stator of the rotary electric machine as seen from the radial direction of the input shaft.

According to the second aspect, the rotation sensor is disposed to overlap not only the oil pump but also the stator as seen from the radial direction of the input shaft. Thus, the axial length of the space occupied by the rotation sensor, the oil pump, and the stator can be further reduced. In the case where the stator and the oil pump overlap each other as seen from the radial direction, all of the rotation sensor, the oil pump, and the stator are at least partially disposed at the same position in the axial direction, which makes it possible to increase the degree to which the axial length is reduced.

According to a third aspect of the present invention, the rotation sensor may be disposed to overlap the pump rotor as seen from the radial direction of the input shaft.

The configuration according to the third aspect facilitates increasing the degree to which the rotation sensor and the oil pump overlap each other as seen from the radial direction, which makes it possible to more reliably reduce the axial length of the space occupied by the rotation sensor, the oil pump, and the stator.

According to a fourth aspect of the present invention, the hybrid drive speed change device may further include a case that houses the friction engagement device, the rotary electric machine, the rotation sensor, the oil pump, and the speed change mechanism. In the hybrid drive speed change device, the oil pump may generate a hydraulic pressure for actuating at least one of an engagement element provided in the speed change mechanism and the friction engagement device, a space in the case may be partitioned by a partition wall extending in the radial direction and a circumferential direction of the input shaft into a first chamber positioned on one side in an axial direction of the input shaft and a second chamber positioned on the other side in the axial direction, the first chamber may house the friction engagement device, the rotary electric machine, and the rotation sensor, and the second chamber may house the speed change mechanism, the partition wall may include a member that forms the pump case; and a sensor stator of the rotation sensor may be fixed to the partition wall.

According to the fourth aspect, in the case where the case of the hybrid drive speed change device includes a partition wall, the sensor stator can be fixed by effectively utilizing the partition wall without providing a wall portion exclusively for fixation of the sensor stator. Accordingly, the axial dimension of the hybrid drive speed change device can be reduced compared to a case where a wall portion exclusively for fixation of the sensor stator is provided.

According to a fifth aspect of the present invention, the rotation sensor may include a sensor rotor and the sensor stator provided radially inwardly of the sensor rotor.

The configuration according to the fifth aspect facilitates securing the distance between the sensor stator and the stator of the rotary electric machine compared to a configuration in which the sensor stator is provided radially outwardly of the sensor rotor. Accordingly, in the case where the sensor stator is configured to generate an output signal (detection signal) of the rotation sensor, the detection error due to electromagnetic noise generated from the stator of the rotary electric machine can be suppressed.

According to a sixth aspect of the present invention, the hybrid drive speed change device may further include a case that houses the friction engagement device, the rotary electric machine, the rotation sensor, the oil pump, and the speed change mechanism. In the hybrid drive speed change device, a space in the case may be partitioned by a partition wall extending in the radial direction and a circumferential direction of the input shaft into a first chamber positioned on one side in an axial direction of the input shaft and a second chamber positioned on the other side in the axial direction, the first chamber may house the friction engagement device, the rotary electric machine, and the rotation sensor, and the second chamber may house the speed change mechanism, the partition wall may include a member that forms the pump case, and include a retracted portion that is provided in a region overlapping the rotation sensor as seen from the axial direction of the input shaft and that is retracted toward the other side in the axial direction, and a signal line for bringing a detection signal of the rotation sensor to outside of the case may be housed in the retracted portion to extend to a location radially outwardly of the rotation sensor.

The configuration according to the sixth aspect facilitates securing the distance between the signal line through which a detection signal of the rotation sensor flows and the stator which is a generation source of electromagnetic noise, while suppressing an increase in distance between the partition wall and the stator. Accordingly, the signal line for the rotation sensor can be installed in such a manner that suppresses the detection error of the rotation sensor due to electromagnetic noise generated from the stator while suppressing an increase in axial dimension of the hybrid drive speed change device.

According to a seventh aspect of the present invention, in the configuration in which the space in the case is partitioned in the axial direction by the partition wall, the partition wall may include a first member that forms at least a part of the pump case and that has a cylindrical outer peripheral surface portion that is coaxial with the input shaft, and a second member that projects toward the one side in the axial direction of the input shaft and that has a cylindrical portion that is coaxial with the input shaft, the outer peripheral surface portion of the first member and an inner peripheral surface of the cylindrical portion may be disposed opposite each other, and a seal member may be disposed between the outer peripheral surface portion of the first member and the inner peripheral surface of the cylindrical portion, the sensor stator of the rotation sensor may be fixed in contact with an outer peripheral surface of the cylindrical portion, and the sensor rotor of the rotation sensor may be disposed radially outwardly of the sensor stator.

According to the seventh aspect, the inner peripheral surface of the cylindrical portion provided in the second member is connected to the outer peripheral surface portion of the first member via the seal member. Therefore, the cylindrical portion has a considerable axial length. Thus, the sensor stator can be fixed to the partition wall by effectively utilizing the outer peripheral surface of the cylindrical portion which has a considerable axial length. In addition, the sensor stator is fixed in contact with the outer peripheral surface of the cylindrical portion. Therefore, the sensor stator can be positioned easily, which makes it possible to simplify the assembly work of the sensor stator.

DETAILED DESCRIPTION OF THE EMBODIMENT

Figure 1:
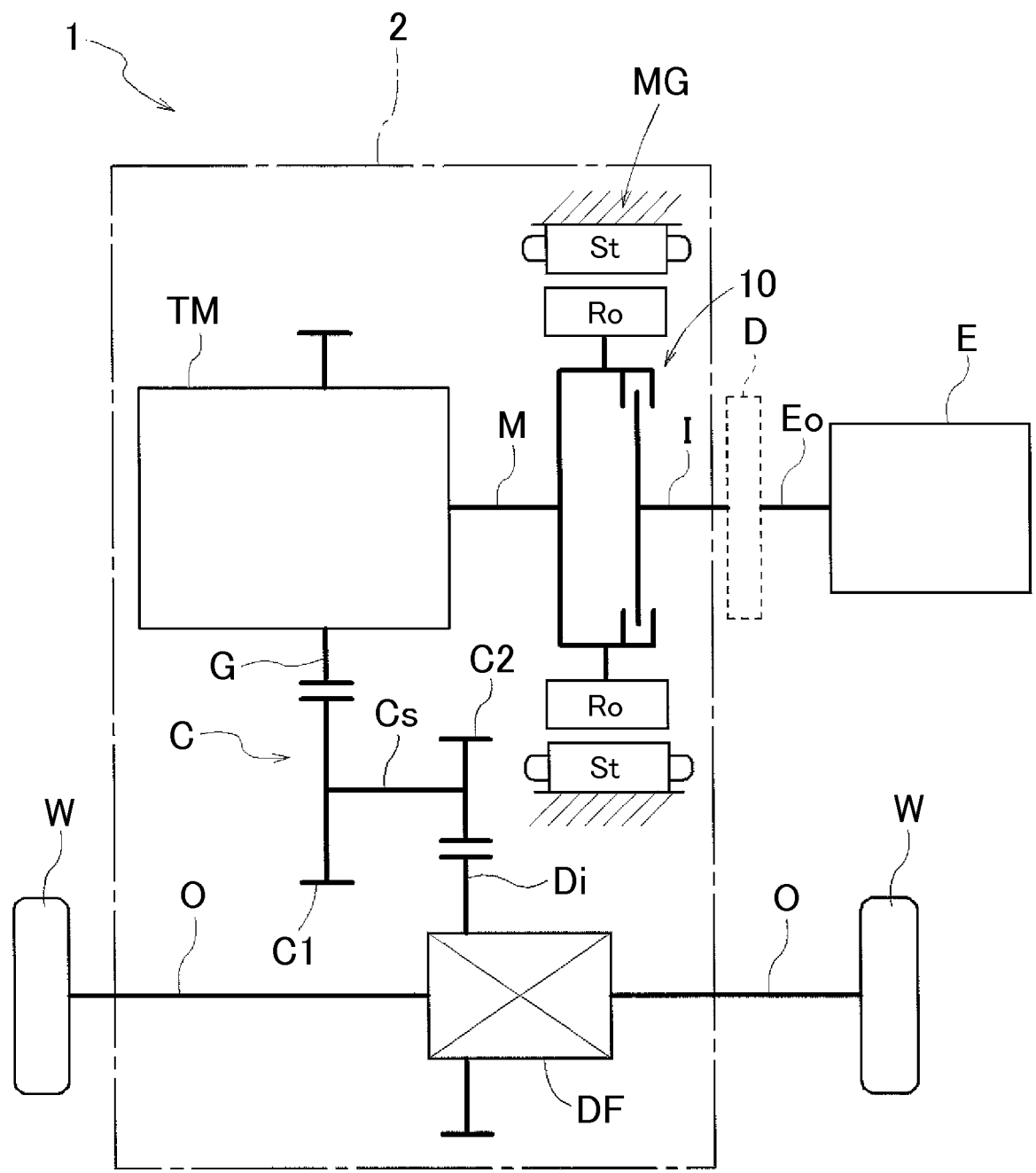
FIG. 1 is a schematic diagram showing a schematic configuration of a hybrid drive speed change device according to an embodiment of the present invention.
Figure 2:
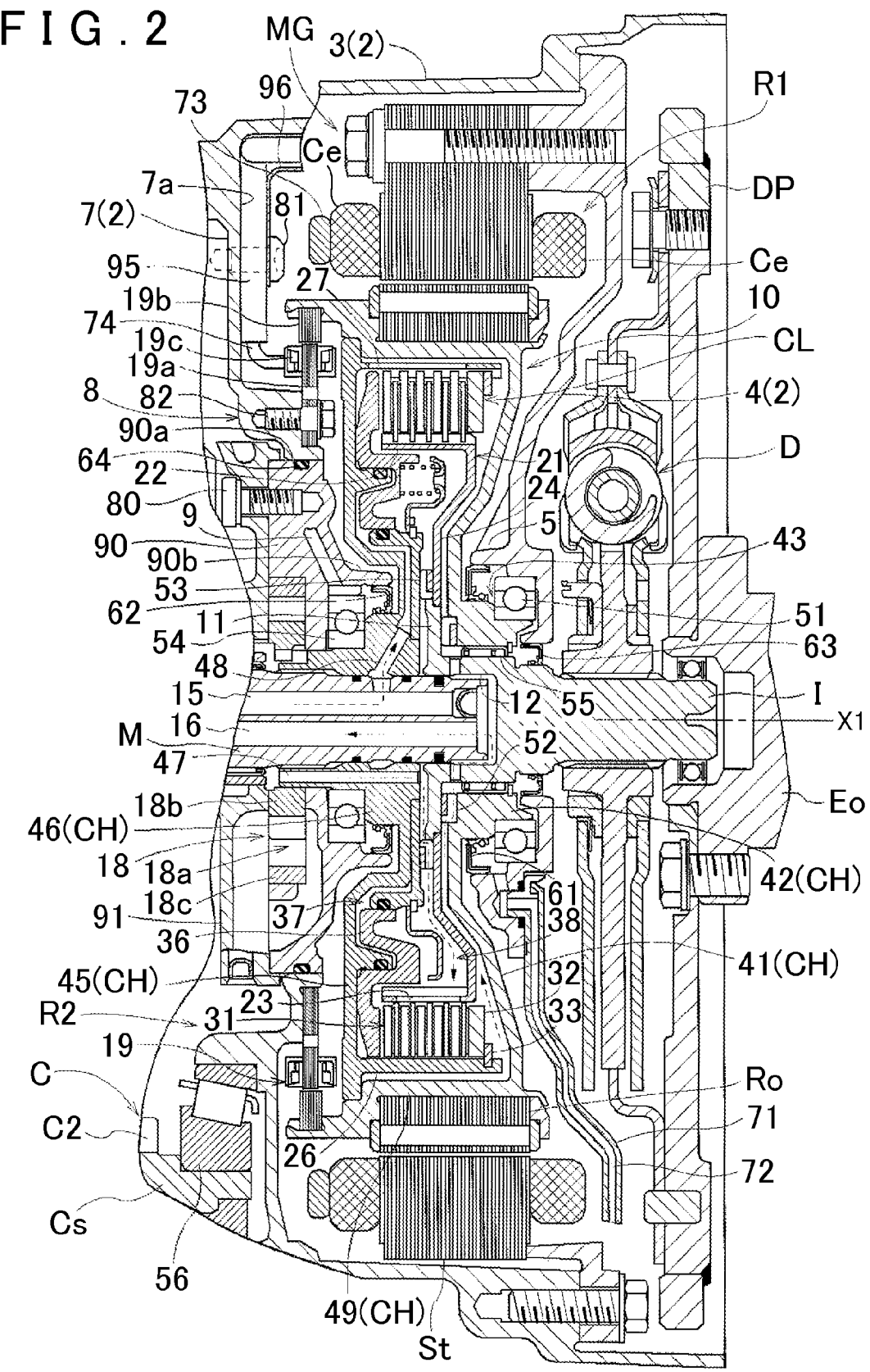
FIG. 2 is a partial cross-sectional view of the hybrid drive speed change device according to the embodiment of the present invention.

A hybrid drive speed change device according to an embodiment of the present invention will be described with reference to the drawings. A hybrid drive speed change device 1 is a drive speed change device for a hybrid vehicle that uses one or both of an internal combustion engine E and a rotary electric machine MG as a drive force source for the vehicle. As shown in FIG. 1, the hybrid drive speed change device 1 includes a starting clutch 10 that selectively drivably couples the internal combustion engine E and the rotary electric machine MG to each other, and is formed as a so-called one-motor parallel type hybrid drive speed change device. As shown in FIG. 2, the hybrid drive speed change device 1 includes a resolver 19 that detects the rotational angle of a rotor Ro of the rotary electric machine MG, and an oil pump 18. The thus configured hybrid drive speed change device 1 according to the embodiment is characterized in that the resolver 19 is disposed radially outwardly of a pump chamber 18a of the oil pump 18 and radially inwardly of a stator St of the rotary electric machine, and disposed to overlap the oil pump 18 as seen from the radial direction of an input shaft M. This enables the resolver 19 to be disposed appropriately from the viewpoint of reducing the axial dimension of the hybrid drive speed change device 1. The hybrid drive speed change device 1 according to the embodiment will be described in detail below.

In the description below, unless otherwise noted, an "axial direction", a "circumferential direction", and a "radial direction" are defined with reference to a rotational axis X1 of the input shaft M (see FIGS. 2 and 4). The rotational axis X1 coincides with the rotational axis of a coupling shaft I, and coincides with the rotational axis of a clutch hub 21 and a clutch drum 26 provided in the starting clutch 10. In the description below, unless otherwise noted, the right side in FIG. 2 is defined as "one side in the axial direction", and the left side in FIG. 2 is defined as the "other side in the axial direction".

In the embodiment, the starting clutch 10, the clutch hub 21, and the clutch drum 26 correspond to the "friction engagement device", the "input-side member", and the "output-side member", respectively, according to the present invention. In the embodiment, in addition, the resolver 19 corresponds to the "rotation sensor" according to the present invention. Moreover, the one side in the axial direction and the other side in the axial direction correspond to the "one side in the axial direction" and the "other side in the axial direction", respectively, according to the present invention.

1. Overall Configuration of Hybrid Drive Speed Change Device

First, the overall configuration of the hybrid drive speed change device 1 according to the embodiment will be described. As shown in FIG. 1, the hybrid drive speed change device 1 includes the coupling shaft I drivably coupled to the internal combustion engine E serving as a first drive force source for the vehicle, the rotary electric machine MG serving as a second drive force source for the vehicle, a speed change mechanism TM, the input shaft M drivably coupled to the rotary electric machine MG and drivably coupled to the speed change mechanism TM, and output shafts O drivably coupled to wheels W. The hybrid drive speed change device 1 also includes the starting clutch 10 provided to switch on and off transfer of a drive force between the coupling shaft I and the input shaft M, a counter gear mechanism C, and an output differential gear device DF. These components are housed in a case 2 serving as a drive speed change device case.

The term "drivably coupled" refers to a state in which two rotary elements are coupled to each other in such a way that enables transfer of a drive force, which includes a state in which the two rotary elements are coupled to each other so as to rotate together with each other, and a state in which the two rotary elements are coupled to each other via one or two or more transmission members in such a way that enables transfer of a drive force. Examples of such transmission members include various members that transfer rotation at an equal speed or a changed speed, such as a shaft, a gear mechanism, a belt, and a chain. The term "drive force" is used as a synonym for torque. The term "rotary electric machine" refers to any of a motor (electric motor), a generator (electric generator), and a motor generator that functions both as a motor and as a generator as necessary.

The internal combustion engine E is a device driven by combusting fuel inside the engine to take out power. Various engines known in the art such as a gasoline engine and a diesel engine, for example, may be used as the internal combustion engine E. In the embodiment, an internal combustion engine output shaft Eo such as a crankshaft of the internal combustion engine E is drivably coupled to the coupling shaft I via a damper D. The coupling shaft I is drivably coupled to the rotary electric machine MG and the input shaft M via the starting clutch 10. The coupling shaft I is selectively drivably coupled to the rotary electric machine MG and the input shaft M through the starting clutch 10. When the starting clutch 10 is in the engaged state, the internal combustion engine E and the rotary electric machine MG are drivably coupled to each other via the coupling shaft I. When the starting clutch 10 is in the disengaged state, the internal combustion engine E and the rotary electric machine MG are decoupled from each other.

The rotary electric machine MG includes the stator St and the rotor Ro, and can function both as a motor (electric motor) that is supplied with electric power to generate power and as a generator (electric generator) that is supplied with power to generate electric power. Therefore, the rotary electric machine MG is electrically connected to an electricity accumulation device (not shown). In the embodiment, a battery is used as the electricity accumulation device. A capacitor or the like may be suitably used as the electricity accumulation device. The rotary electric machine MG receives electric power from the battery for power running, or supplies electric power generated using torque output from the internal combustion engine E or an inertial force of the vehicle to the battery to accumulate the electric power. The rotor Ro of the rotary electric machine MG is drivably coupled to the input shaft M so as to rotate together with the input shaft M. The input shaft M serves as an input shaft of the speed change mechanism TM (transmission input shaft).

The speed change mechanism TM is a device that transfers rotation of the input shaft M to a transmission output gear G while changing the rotational speed with a predetermined speed ratio. In the embodiment, an automatic speed change mechanism including single-pinion type and Ravigneaux type planetary gear mechanisms and a plurality of engagement devices such as a clutch, a brake, and a one-way clutch to switchably provide a plurality of shift speeds with different speed ratios is used as the speed change mechanism TM. An automatic speed change mechanism with other specific configurations, an automatic continuously variable speed change mechanism with continuously variable speed ratios, a manual stepped speed change mechanism that switchably provides a plurality of shift speeds with different speed ratios, or the like may also be used as the speed change mechanism TM. The speed change mechanism TM transfers rotation and torque of the input shaft M to the transmission output gear G while changing the rotational speed with a predetermined speed ratio at each timing and converting torque.

The counter gear mechanism C transfers rotation and torque of the transmission output gear G to the side of the wheels W. The counter gear mechanism C includes a counter shaft Cs, a first gear C1, and a second gear C2. As shown in FIG. 2, the counter shaft Cs is rotatably supported on the case 2 via a sixth bearing 56 (in the embodiment, a tapered roller bearing that can receive a force in the radial direction and the axial direction). The first gear C1 meshes with the transmission output gear G. The second gear C2 meshes with a differential input gear Di of the output differential gear device DF. The output differential gear device DF splits rotation and torque of the differential input gear Di to transfer the split rotation and torque to the plurality of wheels W: In the embodiment, the output differential gear device DF is formed by a differential gear mechanism that uses a plurality of bevel gears meshing with each other, and splits torque transferred to the differential input gear Di via the second gear C2 of the counter gear mechanism C to transfer the split torque to the two, left and right, wheels W via the respective output shafts O. Thus, the hybrid drive speed change device 1 transfers torque of one or both of the internal combustion engine E and the rotary electric machine MG to the wheels W to run the vehicle.

Figure 4:
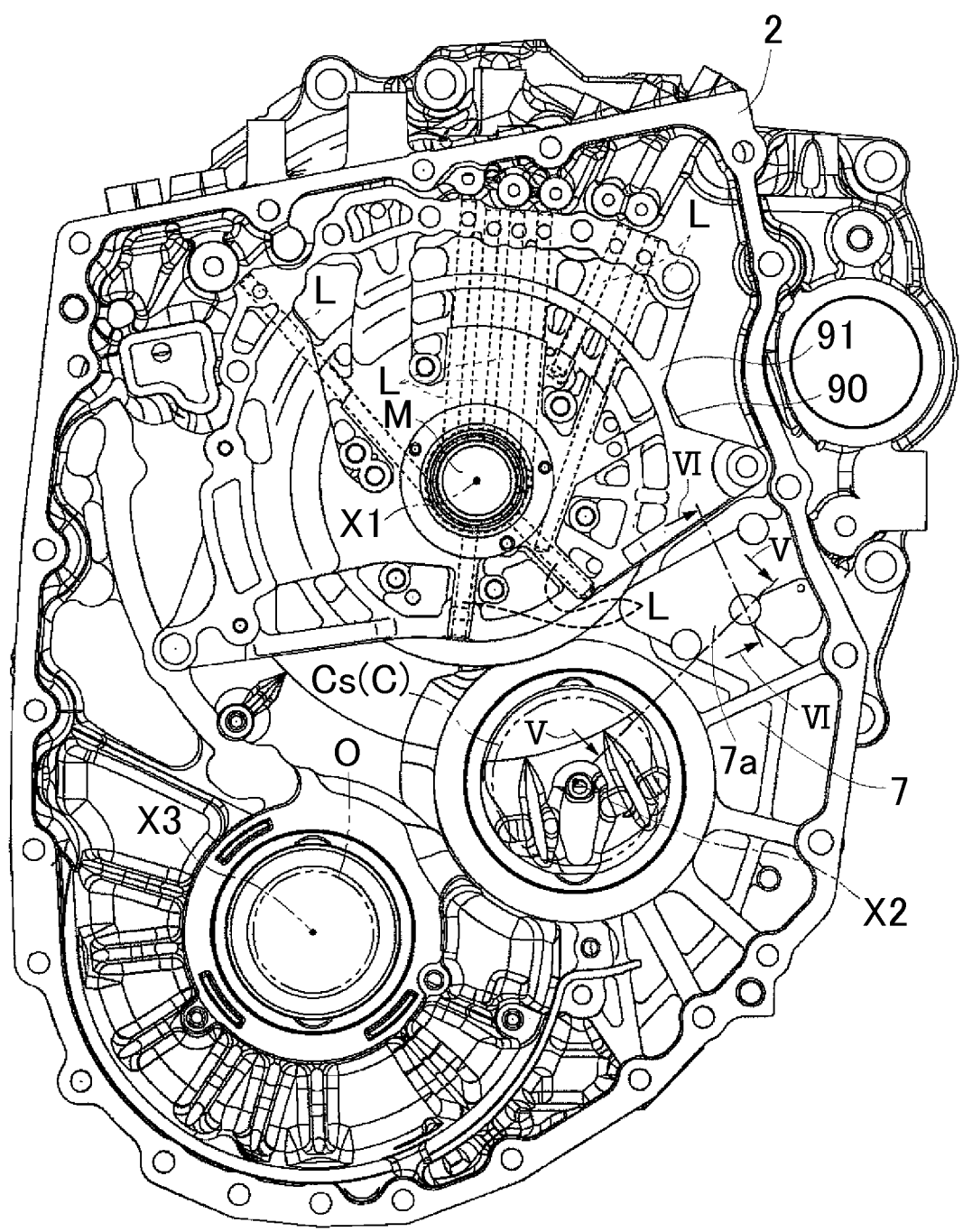
FIG. 4 shows a portion of the hybrid drive speed change device according to the embodiment of the present invention on one side in the axial direction as seen from the other side in the axial direction.

In the hybrid drive speed change device 1 according to the embodiment, as shown in FIGS. 2 and 4, the coupling shaft I and the input shaft M are disposed coaxially with each other (on the rotational axis X1), and the counter shaft Cs and the output shafts O are disposed in parallel with each other and non-coaxially with the coupling shaft I and the input shaft M. Specifically, the rotational axis Cs is disposed on a rotational axis X2, and the output shafts O are disposed on a rotational axis X3. Such a configuration is suitable as a configuration of the hybrid drive speed change device 1 to be mounted on FF (Front-Engine Front-Drive) vehicles, for example.

2. Configuration of Various Components of Hybrid Drive Speed Change Device

Next, the configuration of various components of the hybrid drive speed change device 1 according to the embodiment will be described. As shown in FIG. 2, the case 2 includes a case peripheral wall 3 that covers the respective outer peripheries of components housed in the case 2 such as the rotary electric machine MG and the speed change mechanism TM, a first support wall 4 which blocks an opening of the case peripheral wall 3 on the one side in the axial direction (on the side of the internal combustion engine E), and a second support wall 7 provided on the other side in the axial direction (on the side opposite the internal combustion engine E) with respect to the first support wall 4 and disposed between the rotary electric machine MG and the speed change mechanism TM in the axial direction. The case 2 further includes an end portion support wall (not shown) that blocks an end portion of the case peripheral wall 3 on the other side in the axial direction.

The first support wall 4 is shaped to extend at least in the radial direction. In the embodiment, the first support wall 4 extends in the radial direction and the circumferential direction. A through hole in the axial direction is formed in the first support wall 4, and the coupling shaft I, which is inserted through the through hole, penetrates through the first support wall 4 to be inserted into the case 2. The first support wall 4 is coupled to an axially projecting portion 5 that has the shape of a cylinder (boss) projecting toward the other side in the axial direction. The axially projecting portion 5 is integrally coupled to the first support wall 4. In the embodiment, the first support wall 4 is a wall portion having a curved shape like a dish that is convex toward the other side in the axial direction such that a radially inner portion is positioned on the other side in the axial direction with respect to a radially outer portion at a portion of the first support wall 4 through which the coupling shaft I penetrates. The first support wall 4 is disposed adjacently with a predetermined clearance on the one side in the axial direction with respect to a clutch housing CH. An oil passage forming member 71, inside which an oil discharge passage 72 is formed, is attached to the first support wall 4 to extend along the radial direction.

The second support wall 7 is shaped to extend at least in the radial direction. In the embodiment, the second support wall 7 extends in the radial direction and the circumferential direction. A through hole in the axial direction is formed in the second support wall 7. Specifically, the second support wall 7 integrally includes an axially projecting portion 8 that is provided at a radially inner end portion of the second support wall 7 and that has the shape of a cylinder (boss) projecting toward the one side in the axial direction as a whole. The inner peripheral surface of the axially projecting portion 8 defines the outer edge of the through hole formed in the second support wall 7. As discussed later, the axially projecting portion 8 functions as a resolver fixation portion for fixation of a sensor stator 19a of the resolver 19, and also functions as a positioning portion that positions a pump case (in the embodiment, a pump body 90) of the oil pump 18 in the radial direction. The second support wall 7 is disposed adjacently with a predetermined clearance on the other side in the axial direction with respect to the clutch housing CH. In the embodiment, the second support wall 7 corresponds to the "second member" according to the present invention.

Figure 3:
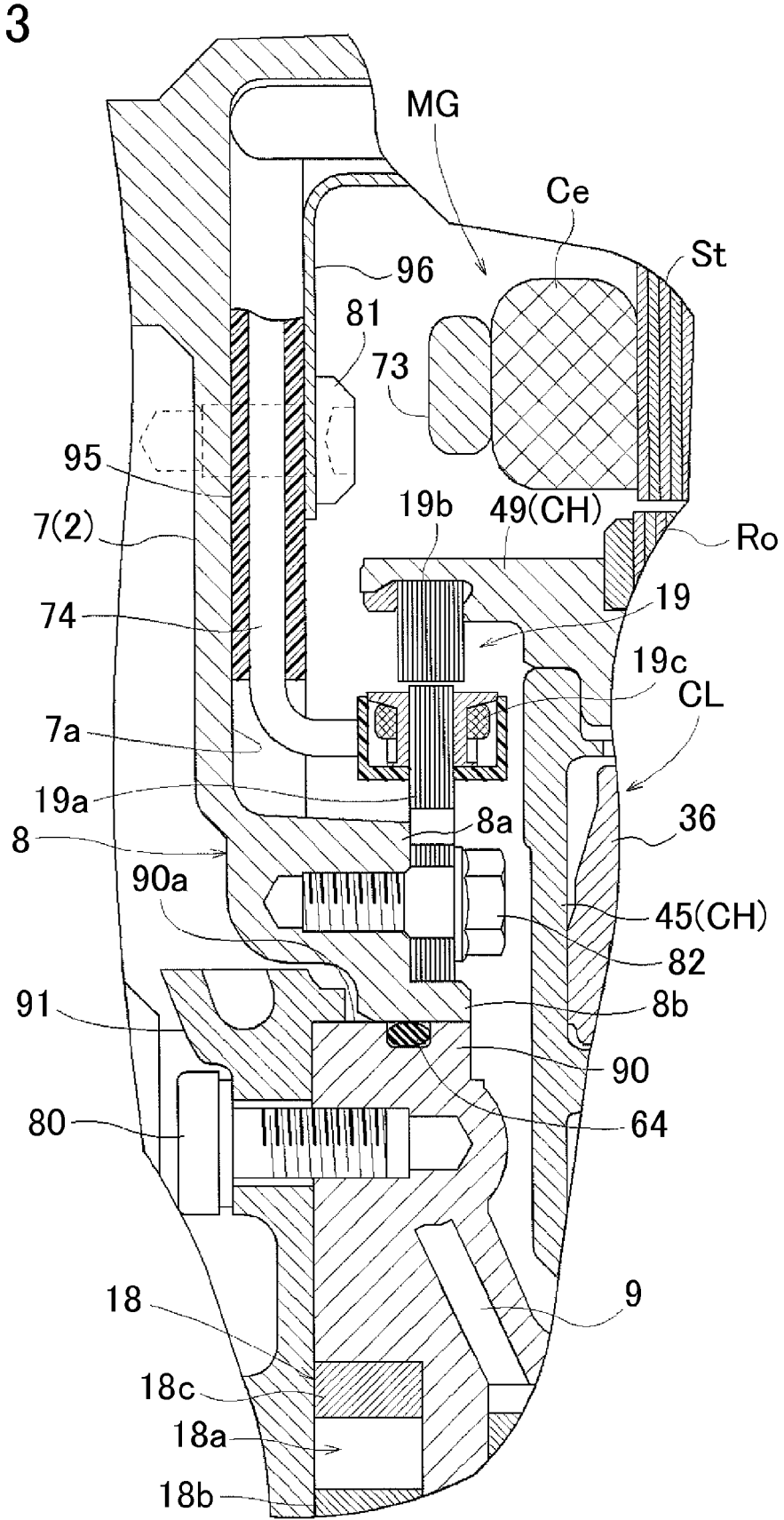
FIG. 3 is a partial enlarged view of FIG. 2.

As shown in FIG. 3, the axially projecting portion 8 provided in the second support wall 7 includes two cylindrical portions that are coaxial with the input shaft M and that are different in radial thickness from each other. Specifically, the axially projecting portion 8 integrally includes a first cylindrical portion 8a, a second cylindrical portion 8b that is positioned on the one side in the axial direction with respect to the first cylindrical portion 8a and that is smaller in radial thickness than the first cylindrical portion 8a, and a connection portion that connects between the first cylindrical portion 8a and the second cylindrical portion 8b. The outer diameter of the second cylindrical portion 8b is set to be smaller than the inner diameter of the first cylindrical portion 8a. As shown in FIG. 3, the second cylindrical portion 8b is positioned radially inwardly of the first cylindrical portion 8a. An end surface of the second cylindrical portion 8b on the one side in the axial direction is positioned on the one side in the axial direction with respect to an end surface of the first cylindrical portion 8a on the one side in the axial direction. That is, the second cylindrical portion 8b is a cylindrical member projecting toward the one side in the axial direction from a body portion of the axially projecting portion 8 (a portion of the axially projecting portion 8 on the other side in the axial direction). End surfaces of both the first cylindrical portion 8a and the second cylindrical portion 8b on the one side in the axial direction are orthogonal to the axial direction. In the thus configured axially projecting portion 8, an annular surface of the first cylindrical portion 8a facing toward the one side in the axial direction and a cylindrical surface of the second cylindrical portion 8b facing toward the outer side in the radial direction are positioned to be orthogonal to each other, which enables the sensor stator 19a of the resolver 19 to be discussed later to be appropriately fixed to the axially projecting portion 8. In the embodiment, the second cylindrical portion 8b corresponds to the "cylindrical portion" according to the present invention.

In the radial direction, the oil pump 18 (pump chamber 18a) is provided radially inwardly of the second support wall 7. In the axial direction, meanwhile, the oil pump 18 (pump chamber 18a) is provided between the speed change mechanism TM and the starting clutch 10, in other words, between the speed change mechanism TM and the rotary electric machine MG. A through hole in the axial direction is formed in the oil pump 18, and the input shaft M, which is inserted through the through hole, penetrates through the oil pump 18. The oil pump 18 includes the pump body 90 and a pump cover 91. The pump body 90 is an annular plate member extending in the radial direction and the circumferential direction, and integrally includes an axially projecting portion 90b that is provided at an end portion of the pump body 90 on the one side in the axial direction and that has the shape of a cylinder (boss) projecting toward the one side in the axial direction. By including the thus configured axially projecting portion 90b, the pump body 90 is shaped to swell in a conical shape as a whole on the one side in the axial direction, and shaped to project toward the starting clutch 10 and the rotary electric machine MG in the axial direction. A recessed portion for forming the pump chamber 18*a* is formed in an end surface of the pump body 90 on the other side in the axial direction to have a circular cross section as seen from the axial direction.

As shown in FIG. 3, the pump body 90 includes a cylindrical outer peripheral surface portion 90*a* that is coaxial with the input shaft M. The pump body 90 is positioned in the radial direction with the outer peripheral surface portion 90*a* fitted with the inner peripheral surface of the axially projecting portion 8. Specifically, the pump body 90 is disposed such that the outer peripheral surface portion 90*a* and the inner peripheral surface of the second cylindrical portion 8*b* face each other with a fourth seal member 64 interposed between the outer peripheral surface portion 90*a* and the inner peripheral surface of the second cylindrical portion 8*b*. In the embodiment, the fourth seal member 64 is an O-ring, and mounted in a recessed groove formed in the outer peripheral surface portion 90*a* of the pump body 90 and extending in the circumferential direction. With the fourth seal member 64 interposed as described above, an area between the outer peripheral surface portion 90*a* of the pump body 90 and the inner peripheral surface of the second cylindrical portion 8*b* of the second support wall 7 is sealed oil-tightly (liquid-tightly). That is, the pump body 90 is oil-tightly fitted in the second cylindrical portion 8*b* via the fourth seal member 64 to be positioned and held on the second support wall 7. In the embodiment, the pump body 90 and the fourth seal member 64 correspond to the "first member" and the "seal member", respectively, according to the present invention. In the embodiment, in addition, the pump body 90 forms the "pump case" according to the present invention.

The pump cover 91 is an annular plate member extending in the radial direction and the circumferential direction. An end surface of the pump body 90 on the other side in the axial direction and an end surface of the pump cover 91 on the one side in the axial direction are joined to each other so that the pump chamber 18*a* for housing an inner rotor 18*b* and an outer rotor 18*c* to be discussed later is formed inside the pump body 90 and the pump cover 91. Specifically, the pump chamber 18*a* is formed by the recessed portion provided in the pump body 90 and having a circular cross section described above and the end surface of the pump cover 91 on the one side in the axial direction. In the embodiment, the pump body 90 and the pump cover 91 are fastened to each other by a fastening bolt 80. Although not shown, the pump cover 91 is fastened to the case 2 by a fastening member such as a bolt so that the pump case is fixed to the case 2. In the embodiment, the pump cover 91 as well as the pump body 90 forms the "pump case" according to the present invention. That is, in the embodiment, the pump body 90 and the pump cover 91 form the "pump case" according to the present invention.

In the embodiment, the oil pump 18 is an internal gear pump having the inner rotor 18*b* and the outer rotor 18*c*. The inner rotor 18*b* and the outer rotor 18*c* are rotatably housed in the pump chamber 18*a* described above. The inner rotor 18*b* is a pump gear disposed coaxially with the input shaft M, and is drivably coupled (here, splined) to the clutch housing CH at the radially central portion of the inner rotor 18*b* so as to rotate together with the clutch housing CH. As the clutch housing CH rotates, the oil pump 18 discharges oil to generate a hydraulic pressure for supplying oil to the starting clutch 10, the speed change mechanism TM, etc. That is, the oil pump 18 generates a hydraulic pressure for actuating at least one (in the embodiment, both) of an engagement element provided in the speed change mechanism TM and the starting clutch 10. Oil passages are formed inside the pump case (the pump body 90 and the pump cover 91), the input shaft M, and so forth. Oil discharged from the oil pump 18 flows through a hydraulic pressure control device (not shown) and the oil passages to be supplied to respective portions to which oil should be supplied. In FIG. 4, oil passages L formed in the pump cover 91 are schematically indicated by broken lines. Although not shown, the hydraulic pressure control device is disposed on the upper side in FIG. 4 and on the front side with respect to the sheet surface of FIG. 4. Some of the oil passages L extending from the rotational axis X1 toward the upper side in FIG. 4 are oil passages extending from the oil pump 18 to the hydraulic pressure control device, and others of such oil passages L are oil passages extending from the hydraulic pressure control device to the destinations of oil. As shown in FIGS. 2 and 3, an oil discharge passage 9 for discharging oil having lubricated the fourth bearing 54 is formed in the pump body 90. In the embodiment, the inner rotor 18*b* corresponds to the "pump rotor" according to the present invention.

In the embodiment, as shown in FIG. 2, the space in the case 2 is partitioned in the axial direction by the second support wall 7 extending in the radial direction and the circumferential direction and the pump case (the pump body 90 and the pump cover 91) also extending in the radial direction and the circumferential direction. That is, the second support wall 7 and the pump case cooperatively form a wall portion extending in the radial direction and the circumferential direction and partitioning the space in the case 2 in the axial direction. Thus, in the embodiment, the second support wall 7 and the pump case form the "partition wall" according to the present invention. The partition wall includes a member forming the pump case. In other words, the partition wall includes the pump body 90, which forms a part of the pump case, and the second cylindrical portion 8*b*.

Here, the space in the case positioned on the one side in the axial direction with respect to the partition wall is defined as a first chamber R1, and the space in the case positioned on the other side in the axial direction with respect to the partition wall is defined as a second chamber R2. When the first chamber R1 and the second chamber R2 are defined in this way, of the starting clutch 10, the rotary electric machine MG, the resolver 19, the oil pump 18, and the speed change mechanism TM housed inside the case 2, the starting clutch 10, the rotary electric machine MG, and the resolver 19 are housed in the first chamber R1, and the speed change mechanism TM is housed in the second chamber R2. In the embodiment, as described above, an area between the outer peripheral surface portion 90*a* of the pump body 90 and the inner peripheral surface of the second cylindrical portion 8*b* of the second support wall 7 is sealed oil-tightly. Therefore, communication of oil between the first chamber R1 and the second chamber R2 is basically prohibited except via an oil passage. Thus, the space in the first chamber R1 excluding the inside of the clutch housing CH can be kept in the dry state in which no oil flows.

The coupling shaft I is a shaft used to input torque of the internal combustion engine E to the hybrid drive speed change device 1. An end portion of the coupling shaft I on the one side in the axial direction is drivably coupled to the internal combustion engine E. That is, the coupling shaft I is a shaft that couples the internal combustion engine E and the hybrid drive speed change device 1 to each other. Here, the coupling shaft I is installed to penetrate through the first support wall 4. As shown in FIG. 2, the coupling shaft I is drivably coupled to the internal combustion engine output shaft Eo of the internal combustion engine E via the damper D at a position on the one side in the axial direction with respect to the first support wall 4 so as to rotate together with the internal combustion engine output shaft Eo. The damper D is a device that transfers rotation of the internal combustion engine output shaft Eo to the coupling shaft I while attenuating torsional vibration of the internal combustion engine output shaft Eo. Various dampers known in the art may be used as the damper D. In the embodiment, the damper D includes a plurality of coil springs disposed along the circumferential direction. The damper D is integrally fixed to a drive plate DP fixed to the internal combustion engine output shaft Eo, and splined to the coupling shaft I. The damper D is formed as a whole to be smaller in diameter than the drive plate DP, and disposed on the other side in the axial direction with respect to the drive plate DP. A third seal member 63 is installed between the coupling shaft I and the first support wall 4 to suppress leakage of oil to the one side in the axial direction (to the side of the damper D and the internal combustion engine E) by liquid-tightly sealing an area between the coupling shaft I and the first support wall 4.

In the embodiment, an axial end hole portion 12 extending in the axial direction is formed in a radially inner portion of an end portion of the coupling shaft I on the other side in the axial direction. An end portion of the input shaft M on the one side in the axial direction is inserted in the axial direction into the axial end hole portion 12. A flange portion 11 extending in the radial direction from the coupling shaft I is formed at the end portion of the coupling shaft I on the other side in the axial direction. The flange portion 11 is formed integrally with the coupling shaft I. The flange portion 11 is inserted into the clutch housing CH to be coupled to the clutch hub 21 of the starting clutch 10 housed in the clutch housing CH. A second bearing 52 is installed on the one side in the axial direction with respect to the flange portion 11. A third bearing 53 is installed radially outwardly of the flange portion 11 and on the other side in the axial direction with respect to the clutch hub 21 of the starting clutch 10.

The input shaft M is a shaft used to input one or both of torque of the rotary electric machine MG and torque of the internal combustion engine E via the starting clutch 10 to the speed change mechanism TM, and is splined to the clutch housing CH. As shown in FIG. 2, the input shaft M is installed to penetrate through the oil pump 18. As described above, a through hole in the axial direction is formed in the radially central portion of the oil pump 18, and the input shaft M penetrates through the oil pump 18 via the through hole. The input shaft M is supported in the radial direction so as to be rotatable with respect to the oil pump 18. In other words, the pump case (the pump body 90 and the pump cover 91) of the oil pump 18 rotatably supports the input shaft M serving as an input shaft of the speed change mechanism TM (transmission input shaft). An end portion of the input shaft M on the one side in the axial direction is inserted in the axial direction into the axial end hole portion 12 of the coupling shaft I. In this state, a predetermined gap is formed between an end surface of the input shaft M on the one side in the axial direction and a surface defining the bottom portion of the axial end hole portion 12 of the coupling shaft I in the axial direction. In the embodiment, a plurality of oil passages including an oil supply passage 15 and an oil discharge passage 16 are formed in the radially inner portion of the input shaft M. The oil supply passage 15 extends in the axial direction in the input shaft M on the one side in the axial direction, and extends in the radial direction at a predetermined position in the axial direction to open in the outer peripheral surface of the input shaft M so as to communicate with a working oil chamber 37 of the starting clutch 10. The oil discharge passage 16 extends in the axial direction in the input shaft M at a position in the circumferential direction that is different from that of the oil supply passage 15 on the one side in the axial direction to open in the end surface of the input shaft M on the one side in the axial direction.

As described above, the starting clutch 10 is a friction engagement device provided to switch cm and off transfer of a drive force between the coupling shaft I and the input shaft M and to selectively drivably couple the internal combustion engine E and the rotary electric machine MG to each other. In the embodiment, the starting clutch 10 is formed as a wet multi-plate clutch mechanism that operates in a space supplied with oil. As shown in FIG. 2, the starting clutch 10 includes the clutch hub 21, the clutch drum 26, a clutch mechanism CL that selectively drivably couples the clutch hub 21 and the clutch drum 26 to each other, and the clutch housing CH. The clutch mechanism CL includes a plurality of friction plates 31, a piston 36, and a backing plate 32. In the embodiment, the clutch mechanism CL corresponds to the "engagement mechanism" according to the present invention.

The clutch hub 21 is coupled to the flange portion 11 of the coupling shaft I so as to rotate together with the coupling shaft I, and disposed radially inwardly of the clutch drum 26. As described above, the coupling shaft I is drivably coupled to the internal combustion engine E. Accordingly, the clutch hub 21 is drivably coupled to the internal combustion engine E via the coupling shaft I. The clutch drum 26 is coupled to the input shaft M via the clutch housing CH so as to rotate together with the input shaft M. As described above, the input shaft M is drivably coupled to the speed change mechanism TM. Accordingly, the clutch drum 26 is drivably coupled to the speed change mechanism TM via the clutch housing CH and the input shaft M. In other words, the input shaft M drivably couples the clutch drum 26 and the speed change mechanism TM to each other. The plurality of friction plates 31 are held on the clutch hub 21 and the clutch drum 26 so as to be freely slidable in the axial direction. The backing plate 32 is held on the one side in the axial direction with respect to the plurality of friction plates 31. The backing plate 32 functions as a pressing member when the plurality of friction plates 31 are to be engaged with each other. The backing plate 32 is held by a snap ring 33 so as not to be movable in the axial direction. The piston 36 is disposed on the other side in the axial direction with respect to the plurality of friction plates 31, and urged by a return spring toward the other side in the axial direction.

In the embodiment, the working oil chamber 37 which is liquid-tight is formed between the clutch housing CH, which is integrated with the clutch drum 26, and the piston 36. The working oil chamber 37 is an oil chamber used to control the engagement state (completely engaged, completely disengaged, or partially engaged therebetween) of the clutch mechanism CL. The working oil chamber 37 is supplied with pressurized oil, which has been discharged from the oil pump 18 and adjusted to a predetermined hydraulic pressure by a hydraulic pressure control device (not shown), via the oil supply passage 15 formed in the input shaft M and an oil communication passage 48 formed in the clutch housing CH. When the hydraulic pressure in the working oil chamber 37 rises to be larger than the urging force of the return spring, the piston 36 moves in the direction of increasing the capacity of the working oil chamber 37 (in the embodiment, toward the one side in the axial direction) to engage the plurality of friction plates 31 with each other in cooperation with the backing plate 32. As a result, torque of the internal combustion engine E transferred from the coupling shaft I is transferred to the rotary electric machine MG and the input shaft M via the starting clutch 10. On the other hand, an oil circulation chamber 38 is formed opposite the working oil chamber 37 with respect to the piston 36. The oil circulation chamber 38 is an oil chamber for circulation of oil for cooling mainly the clutch mechanism CL. The oil circulation chamber 38 is supplied with pressurized oil, which has been discharged from the oil pump 18 and adjusted to a predetermined hydraulic pressure by a hydraulic pressure control device (not shown), via an oil circulation passage 47 (see FIG. 2) formed in the clutch housing CH.

As shown in FIG. 2, the clutch housing CH houses the clutch hub 21, the clutch drum 26, and the clutch mechanism CL. The clutch housing CH is installed across the coupling shaft I and the input shaft M so as to be relatively rotatable with respect to the coupling shaft I and rotatable together with the input shaft M. The clutch housing CH is provided radially outwardly of the coupling shaft I and the input shaft M, which are disposed coaxially with each other, to house the clutch mechanism CL by covering both sides of the clutch mechanism CL in the axial direction and the outer side of the clutch mechanism CL in the radial direction. Therefore, the clutch housing CH includes a one-side radially extending portion 41 disposed on the one side in the axial direction with respect to the clutch mechanism CL to extend in the radial direction, an other-side radially extending portion 45 disposed on the other side in the axial direction with respect to the clutch mechanism CL to extend in the radial direction, and a cylindrical covering portion 49 that couples respective radially outer end portions of the one-side radially extending portion 41 and the other-side radially extending portion 45 to each other in the axial direction.

The one-side radially extending portion 41 is shaped to extend at least in the radial direction. In the embodiment, the one-side radially extending portion 41 extends in the radial direction and the circumferential direction. The one-side radially extending portion 41 defines the oil circulation chamber 38 on the one side in the axial direction. A through hole in the axial direction is formed in the radially central portion of the one-side radially extending portion 41, and the coupling shaft I, which is inserted through the through hole, penetrates through the one-side radially extending portion 41 to be inserted into the clutch housing CH. The one-side radially extending portion 41 is coupled to an axially projecting portion 42 that has the shape of a cylinder (boss) projecting toward the one side in the axial direction. The axially projecting portion 42 is formed to surround the circumference of the coupling shaft I. A fifth bearing 55 is installed between the axially projecting portion 42 and the coupling shaft I. The axially projecting portion 42 is integrally coupled to the one-side radially extending portion 41 at a radially inner end portion of the one-side radially extending portion 41. In the embodiment, the one-side radially extending portion 41 is a member having a curved shape like a dish that is convex toward the other side in the axial direction such that a radially inner portion is positioned on the other side in the axial direction with respect to a radially outer portion as a whole. The one-side radially extending portion 41 is disposed adjacently with a predetermined clearance on the other side in the axial direction with respect to the first support wall 4. The axially projecting portion 42 is disposed adjacently with a predetermined clearance on the inner side in the radial direction with respect to the axially projecting portion 5 of the first support wall 4. Further, the one-side radially extending portion 41 is disposed adjacently with a predetermined clearance on the one side in the axial direction with respect to the clutch hub 21 and the flange portion 11 of the coupling shaft I. A first bearing 51 and a first seal member 61, which suppresses leakage of oil to the other side in the axial direction (to the side of the rotary electric machine MG) by liquid-tightly sealing an area between the axially projecting portion 42 and the axially projecting portion 5 of the first support wall 4, are installed between the axially projecting portion 42 and the axially projecting portion 5.

The cylindrical covering portion 49 has the shape of a cylinder that covers the radially outer side of the clutch mechanism CL. In the embodiment, the cylindrical covering portion 49 extends from a radially outer end portion of the one-side radially extending portion 41 toward the other side in the axial direction. The cylindrical covering portion 49 defines the oil circulation chamber 38 on the radially outer side. In the embodiment, the cylindrical covering portion 49 is formed integrally with the one-side radially extending portion 41. In the embodiment, in addition, the cylindrical covering portion 49 is disposed radially outwardly of the clutch drum 26 with a predetermined clearance between the cylindrical covering portion 49 and the clutch drum 26. That is, the cylindrical covering portion 49 is disposed such that the inner peripheral surface of the cylindrical covering portion 49 and the outer peripheral surface of the clutch drum 26 oppose each other with a predetermined clearance therebetween in the radial direction.

The other-side radially extending portion 45 is shaped to extend at least in the radial direction. In the embodiment, the other-side radially extending portion 45 extends in the radial direction and the circumferential direction. The other-side radially extending portion 45 defines the oil circulation chamber 38 on the other side in the axial direction with a portion on the radially inner side with respect to the piston 36 and a portion on the radially outer side with respect to the working oil chamber 37. In the embodiment, the other-side radially extending portion 45 is a plate member having a shape in which a radially inner portion is offset toward the one side in the axial direction with respect to a radially outer portion such that the radially inner portion is positioned on the one side in the axial direction with respect to the radially outer portion as a whole. The other-side radially extending portion 45 is coupled by welding or the like to a portion of the cylindrical covering portion 49 on the other side in the axial direction in the vicinity of a radially outer end portion of the other-side radially extending portion 45. A through hole in the axial direction is formed in the radially central portion of the other-side radially extending portion 45, and the input shaft M, which is inserted through the through hole, penetrates through the other-side radially extending portion 45 to be inserted into the clutch housing CH. The inner peripheral surface of a radially inner end portion of the other-side radially extending portion 45 abuts against the outer peripheral surface of the input shaft M over the entire circumference. The other-side radially extending portion 45 is coupled to an axially projecting portion 46 that has the shape of a cylinder (boss) projecting toward the other side in the axial direction. The axially projecting portion 46 is formed to surround the circumference of the input shaft M. The axially projecting portion 46 is integrally coupled to the other-side radially extending portion 45 at a radially inner end portion of the other-side radially extending portion 45.

The axially projecting portion 46 is splined to the input shaft M so as to rotate together with the input shaft M. The other-side radially extending portion 45 is disposed adjacently with a predetermined clearance on the one side in the axial direction with respect to the second support wall 7 and the oil pump 18 (pump body 90). The axially projecting portion 46 is disposed adjacently with a predetermined clearance on the inner side in the radial direction with respect to an axially projecting portion 90*b* integrally provided in the pump body 90. Further, the other-side radially extending portion 45 is disposed adjacently with a predetermined clearance on the other side in the axial direction with respect to the clutch hub 21 and the flange portion 11 of the coupling shaft I at the radially inner portion of the other-side radially extending portion 45. A fourth bearing 54 and a second seal member 62, which suppresses leakage of oil to the one side in the axial direction (to the side of the rotary electric machine MG) by liquid-tightly sealing an area between the axially projecting portion 46 and the axially projecting portion 90*b* of the pump body 90, are installed across the axially projecting portion 46 and the axially projecting portion 90*b*.

In the embodiment, the clutch drum 26 is formed integrally with the other-side radially extending portion 45. More specifically, the cylindrical clutch drum 26 is integrally formed to extend from the other-side radially extending portion 45 toward the one side in the axial direction in the vicinity of a radially outer end portion of the other-side radially extending portion 45. In the embodiment, in addition, the working oil chamber 37 is formed between the radially inner portion of the other-side radially extending portion 45 and the piston 36. The oil communication passage 48, which extends in the radial direction as a whole with slight inclination toward the one side in the axial direction with respect to the radial direction to provide communication between the oil supply passage 15 and the working oil chamber 37, is formed in the other-side radially extending portion 45 at a portion at which the other-side radially extending portion 45 is coupled to the axially projecting portion 46.

Of the space formed inside the clutch housing CH, most of the space excluding the working oil chamber 37 serves as the oil circulation chamber 38 described earlier. In the embodiment, oil discharged from the oil pump 18 and adjusted to a predetermined hydraulic pressure is supplied to the oil circulation chamber 38 via the oil circulation passage 47 formed to extend in the axial direction in the axially projecting portion 46. In the embodiment, the fifth bearing 55 installed between the axially projecting portion 42 and the coupling shaft I is a bearing with a sealing function (here, a needle bearing with a seal ring) configured to secure a certain degree of liquid tightness. Further, the inner peripheral surface of a radially inner end portion of the other-side radially extending portion 45 abuts against the outer peripheral surface of the input shaft M over the entire circumference. Therefore, when oil is supplied to the oil circulation chamber 38 via the oil circulation passage 47, the oil circulation chamber 38 in the clutch housing CH is basically always filled with oil.

While the oil circulation chamber 38 is basically always filled with oil, oil flows through the oil circulation chamber 38. This flow is indicated by broken arrows in FIG. 2. That is, oil supplied from the oil circulation passage 47 to the oil circulation chamber 38 first flows radially outward through an area between the other-side radially extending portion 45 and the flange portion 11 and an area between the piston 36 and the clutch hub 21 to cool the plurality of friction plates 31. Then, oil having cooled the plurality of friction plates 31 flows radially inward through an area between the clutch hub 21 and the flange portion 11, and the one-side radially extending portion 41 to reach the base end portion of the flange portion 11. Thereafter, oil is discharged from the oil circulation chamber 38. Thus, in the hybrid drive speed change device 1 according to the embodiment, the plurality of friction plates 31 provided in the clutch mechanism CL can be cooled effectively with a large amount of oil always filling the oil circulation chamber 38.

In the embodiment, further, although not described in detail, in order to efficiently introduce oil supplied from the radially inner side into a gap between the friction plates 31, a through hole 23 (in the embodiment, a slit-like through hole) is formed in a portion (cylindrical portion) of the clutch hub 21 that holds the friction plates 31 in a manner as to penetrate the portion of the clutch hub 21 in the radial direction. In addition, in order to allow oil introduced into the gap between the friction plates 31 to be appropriately discharged from the gap, a through hole 27 (in the embodiment, a slit-like through hole) penetrating in the radial direction is formed in the clutch drum 26. This enables oil supplied from the radially inner side to be efficiently introduced into the gap between the friction plates 31, which makes it possible to improve the efficiency of cooling the plurality of friction plates 31. While oil may flow in the circumferential direction at the same time as a matter of course, the main flow of oil is as described above.

In the embodiment, as shown in FIG. 2, there are two systems of discharge paths for oil from the oil circulation chamber 38. A first discharge path passes via a communication hole in the radial direction opening in the outer peripheral surface of the coupling shaft I and the oil discharge passage 16 formed in the radially inner portion of the input shaft M. In the embodiment, the outside diameter of an end portion of the input shaft M on the one side in the axial direction is formed to be slightly smaller than the inside diameter of the axial end hole portion 12 of the coupling shaft I, and a predetermined gap is formed between an end surface of the input shaft M on the one side in the axial direction and a surface defining the bottom portion of the axial end hole portion 12 of the coupling shaft I in the axial direction. This enables oil discharged from the oil circulation chamber 38 through the communication hole in the radial direction formed in the coupling shaft I to be appropriately guided to the oil discharge passage 16 via a radial gap and an axial gap formed between the input shaft M and the axial end hole portion 12 of the coupling shaft I. A second discharge path is provided for oil leaking from the fifth bearing 55 in the axial direction, and passes via the oil discharge passage 72 inside the oil passage forming member 71 attached to the first support wall 4. The second discharge path is defined by the third seal member 63, which is installed between the coupling shaft I and the first support wall 4, and the first seal member 61, which is installed between the axially projecting portion 42 of the clutch housing CH and the axially projecting portion 5 of the first support wall 4. This enables oil leaking from the fifth bearing 55 in the axial direction to be appropriately guided to the oil discharge passage 72.

As shown in FIG. 2, the rotary electric machine MG is disposed radially outwardly of the clutch housing CH and coaxially with the input shaft M. The rotary electric machine MG includes the stator St fixed to the case 2 and the rotor Ro supported radially inwardly of the stator St so as to be freely rotatable. That is, in the rotary electric machine, the rotor Ro is provided radially inwardly of the stator St. The stator St includes a stator core fixed to the first support wall 4 and formed as a laminated structure in which a plurality of magnetic steel sheets each formed in an annular plate shape are laminated on each other, and a coil wound around the stator core. Portions of the coil that project from both sides of the stator core in the axial direction are coil end portions Ce. A plurality of (for example, three) connection terminals for connection of lead wires (power lines) that electrically connect the rotary electric machine MG and an inverter (not shown) to each other are provided further on the other side in the axial direction with respect to the coil end portion Ce on the other side in the axial direction. A portion indicated by reference numeral 73 in FIG. 2 schematically shows the space occupied by the plurality of connection terminals. The rotor Ro of the rotary electric machine MG includes a rotor core formed as a laminated structure in which a plurality of magnetic steel sheets each formed in an annular plate shape are laminated on each other, and permanent magnets embedded in the rotor core.

In the embodiment, the rotary electric machine MG is disposed to overlap the clutch housing CH in the axial direction. In other words, the rotary electric machine MG is disposed to overlap the clutch housing CH as seen from the radial direction. In the embodiment, in particular, the rotor Ro of the rotary electric machine MG is fixed to the outer peripheral portion of the cylindrical covering portion 49 forming the clutch housing CH. That is, the rotor Ro is fixed to the cylindrical covering portion 49 with the respective inner peripheral surfaces of the plurality of magnetic steel sheets forming the rotor core of the rotor Ro contacting the outer peripheral surface of the cylindrical covering portion 49. This allows the clutch housing CH to also function as a rotor support member that supports the rotor Ro. In the embodiment, the clutch housing CH and the rotor support member are formed as a common component. As described above, the clutch drum 26 is formed integrally with the clutch housing CH which rotates together with the rotor Ro of the rotary electric machine MG. That is, the rotary electric machine MG is drivably coupled to the clutch drum 26 via the clutch housing CH. The term "overlap" in a certain direction as used herein in regard to the arrangement of two members refers to a state in which the two members are at least partially disposed at the same position in the certain direction.

In the embodiment, the damper D is disposed with a predetermined gap on the one side in the axial direction with respect to the first support wall 4. The damper D is disposed in a space formed by retracting the first support wall 4, which is formed to have a curved shape like a dish that is convex toward the other side in the axial direction, toward the other side in the axial direction from the one side in the axial direction. In the embodiment, further, the damper D is disposed radially inwardly of the coil end portion Ce of the stator St of the rotary electric machine MG on the one side in the axial direction (on the side of the internal combustion engine E) to overlap the coil end portion Ce in the axial direction. In other words, the damper D is disposed to overlap the coil end portion Ce as seen from the radial direction.

The resolver 19, which is a sensor that detects the rotational angle (rotation phase) of the rotor Ro with respect to the stator St of the rotary electric machine MG, is disposed in the case 2. In the embodiment, as shown in FIG. 3, the resolver 19 is provided on the other side in the axial direction with respect to the clutch housing CH and adjacent to both the second support wall 7 of the case 2 and the other-side radially extending portion 45. Specifically, the sensor stator 19a of the resolver 19 is fixed to the second support wall 7, and a sensor rotor 19b of the resolver 19 is fixed to the inner peripheral surface of an end portion of the cylindrical covering portion 49 on the other side in the axial direction. In the embodiment, the sensor rotor 19b is fixed (caulked) to the cylindrical covering portion 49 through a caulking structure. Although discussed in detail later, the sensor stator 19a is fastened to the second support wall 7.

Although the configuration of the resolver 19 is known in the art and therefore not described in detail here, both the sensor rotor 19b and the sensor stator 19a are formed by laminating a plurality of magnetic steel sheets each formed in an annular plate shape on each other. The core of the sensor stator 19a formed by laminating a plurality of magnetic steel sheets on each other includes a plurality of teeth, and a coil that generates a detection signal of the resolver 19 is wound around the teeth. Therefore, as shown in FIG. 3, coil portions 19c are formed on both sides in the axial direction with respect to the core of the sensor stator 19a by portions of the coil that project toward both sides in the axial direction. A signal line 74 for bringing the detection signal of the resolver 19 to the outside of the case 2 is connected to the coil portions 19c. Although not described in detail, a member that is different from the coil (such as a member formed by a resin or the like that aligns or protects the coil) is disposed adjacent to portions of the coil that project toward both sides in the axial direction from the core of the sensor stator 19a. The term "coil portions 19c" as used herein include such a member that is different from the coil.

In the embodiment, the resolver 19 is an outer-rotor resolver in which the sensor stator 19a is provided radially inwardly of the sensor rotor 19b. This facilitates securing the distance between the sensor stator 19a which generates the detection signal of the resolver 19 and the stator St of the rotary electric machine MG, which makes it possible to suppress the detection error of the resolver 19 due to electromagnetic noise generated from the stator St of the rotary electric machine MG. In the embodiment, further, the cylindrical covering portion 49 to which the sensor rotor 19b is fixed is formed using a magnetic material such as iron, and configured to exhibit the effect of blocking electromagnetic noise generated from the stator St of the rotary electric machine MG. This also makes it possible to suppress the detection error of the resolver 19 due to electromagnetic noise generated from the stator St of the rotary electric machine MG.

As shown in FIG. 3, the sensor stator 19a is fixed in contact with the outer peripheral surface of the second cylindrical portion 8b provided in the second support wall 7. Specifically, the sensor stator 19a is fitted on the outer peripheral surface of the second cylindrical portion 8b to be held on the second support wall 7 in position. In the embodiment, a fastening hole is formed in an end surface of the first cylindrical portion 8a on the one side in the axial direction, and the sensor stator 19a is fastened to the first cylindrical portion 8a (second support wall 7) by a fastening bolt 82 with the sensor stator 19a in abutment against the end surface of the first cylindrical portion 8a on the one side in the axial direction. That is, in the embodiment, the sensor stator 19a is positioned in the radial direction by being fitted with the outer peripheral surface of the second cylindrical portion 8b, and positioned in the axial direction by abutting against the end surface of the first cylindrical portion 8a on the one side in the axial direction. That is, the end surface of the first cylindrical portion 8a on the one side in the axial direction serves as a surface for abutment. The sensor stator 19a may also be fixed to the axially projecting portion 8 through a caulking structure, or retained in the axial direction on the axially projecting portion 8 through a snap ring or by press fitting.

The second support wall 7 forming the partition wall includes a retracted portion 7a that houses the signal line 74 for bringing the detection signal of the resolver 19 to the outside of the case 2. A lead wire for supplying a current to the excitation coil wound around the sensor stator 19a is provided along with the signal line 74. Therefore, in the strict sense, reference numeral 74 in FIG. 2 etc. denotes a cable in which the signal line for bringing the detection signal of the resolver 19 to the outside of the case 2 and the lead wire for supplying a current to the resolver 19 are integrated with each other. In the description below, in order to simplify the description, the cable is described as the signal line 74.

The retracted portion 7a is formed by retracting an end surface of a region of the second support wall 7 on the one side in the axial direction toward the other side in the axial direction. As shown in FIG. 2, the retracted portion 7a is formed in a region overlapping the resolver 19 in the radial direction. That is, the retracted portion 7a is formed in a region overlapping the resolver 19 as seen in the axial direction. In the embodiment, the retracted portion 7a is also formed continuously at a location radially outwardly of the resolver 19. The signal line 74 for the resolver 19 is housed in the retracted portion 7a to extend to a location radially outwardly of the resolver 19. That is, the signal line 74 for the resolver 19 is partially disposed to overlap the second support wall 7 in the axial direction. In the embodiment, a tubular harness guide 95 that houses the signal line 74 for the resolver 19 to guide the signal line 74 is disposed in the retracted portion 7a. As shown in FIG. 3, the harness guide 95 includes a portion extending in the radial direction and a portion extending in the axial direction, which are coupled to each other in the vicinity of the inner peripheral surface of the case peripheral wall 3. Accordingly, the signal line 74 for the resolver 19 housed inside the harness guide 95 extends in the radial direction to a location near the inner peripheral surface of the case peripheral wall 3, thereafter is bent toward the one side in the axial direction, and extends to the outside of the case 2 from a hole portion (not shown).

The configuration in which the signal line 74 for the resolver 19 is housed in the retracted portion 7a as described above facilitates securing the distance between the signal line 74 through which the detection signal of the resolver 19 flows and the stator St of the rotary electric machine MG which is a generation source of electromagnetic noise, while suppressing an increase in distance between the second support wall 7 and the stator St of the rotary electric machine MG. That is, the signal line 74 for the resolver 19 can be installed in such a way that suppresses the detection error of the resolver 19 due to electromagnetic noise generated from the stator St of the rotary electric machine MG while suppressing an increase in axial dimension of the hybrid drive speed change device 1. Although not shown, the lead wires (power lines) which electrically connect the rotary electric machine MG and an inverter (not shown) to each other are not housed in the retracted portion 7a but disposed to extend to the outside of the case 2 in order that electromagnetic noise generated from the lead wires will not affect a signal flowing through the signal line 74 for the resolver 19.

Figure 5:
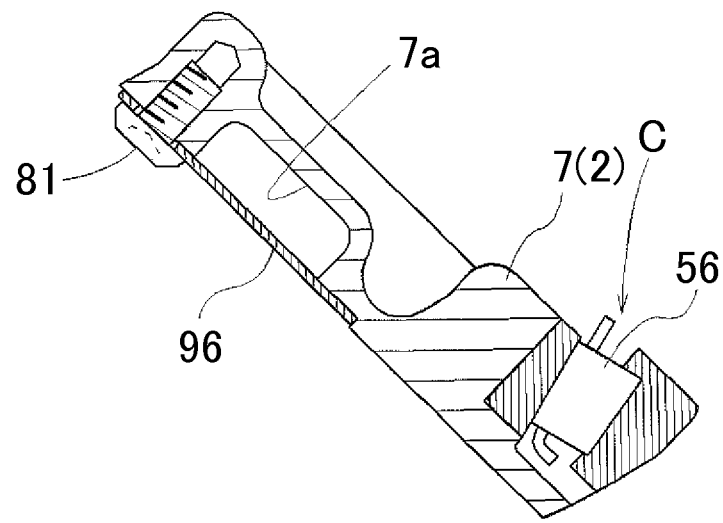
FIG. 5 is a V-V cross-sectional view of FIG. 4.
Figure 6:
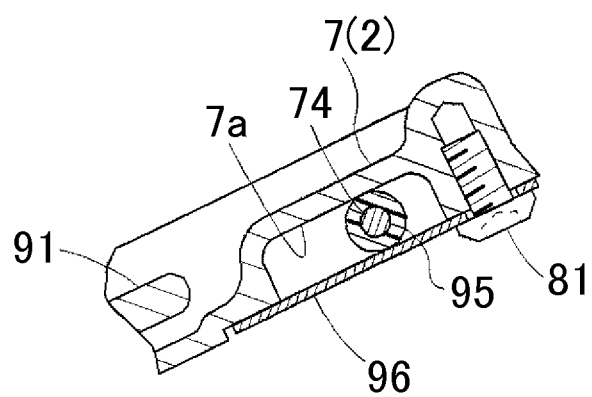
FIG. 6 is a VI-VI cross-sectional view of FIG. 4.

In the embodiment, as shown in FIG. 4, the retracted portion 7a is formed in a V-shape as seen from either side in the axial direction, and formed in a portion opposite the rotational axis X3, on which the output shaft O is disposed, with respect to the line segment connecting the rotational axis X1, on which the coupling shaft I and the input shaft M are disposed, and the rotational axis X2, on which the counter shaft Cs of the counter gear mechanism C is disposed, to each other. Specifically, the retracted portion 7a is formed in a space that is opposite the rotational axis X3 and that is adjacent to both a space occupied by the pump cover 91 and a space occupied by components for the arrangement of the counter shaft Cs. That is, the retracted portion 7a is formed in a vacant space around the space occupied by components for the arrangement of the counter shaft Cs. As shown in FIGS. 5 and 6, an end surface of the second support wall 7 on the other side in the axial direction projects toward the other side in the axial direction in accordance with the amount of retraction of the retracted portion 7a. By forming the retracted portion 7a utilizing the space described above, the retracted portion 7a which is retracted toward the other side in the axial direction can be formed while suppressing the effect on the other constituent elements disposed in the case 2. Thus, the retracted portion 7a is formed in such a manner that suppresses an increase in axial dimension of the hybrid drive speed change device 1. The plurality of oil passages L are formed in the pump cover 91. Therefore, as shown in FIG. 4, the retracted portion 7a is formed at a position at which the retracted portion 7a does not overlap the plurality of oil passages L as seen from either side in the axial direction.

In the embodiment, a harness protection plate 96 having a plate shape is provided to block an opening of the retracted portion 7a on the one side in the axial direction. The harness protection plate 96 abuts against the second support wall 7 from the one side in the axial direction, and is fastened to the second support wall 7 by a fastening bolt 81. In the embodiment, the harness protection plate 96 is formed using a magnetic material such as iron. Accordingly, the harness protection plate 96 exhibits the effect of blocking electromagnetic noise generated from the stator St of the rotary electric machine MG to hinder the electromagnetic noise from reaching the signal line 74 for the resolver 19. As a result, the detection error of the resolver 19 is suppressed.

3. Arrangement of Resolver

Next, the arrangement of the resolver 19 will be described. In the description about the arrangement relationship between various members, the term "stator St" includes the coil end portions Ce formed by the coil wound around the stator core, and the space 73 occupied by the connection terminals provided on the other side in the axial direction with respect to the coil end portion Ce. In the description about the arrangement relationship between various members, in addition, the term "sensor stator 19a" includes the coil portions 19c formed by the coil wound around the core of the sensor stator 19a. Accordingly, as a matter of course, the "resolver 19" which includes the sensor stator 19a includes the coil portions 19c.

As shown in FIG. 2, the resolver 19 is disposed between the pump chamber 18a and the stator St in the radial direction. Specifically, the resolver 19 is disposed radially outwardly of the pump chamber 18a and radially inwardly of the stator St of the rotary electric machine MG. That is, the resolver 19 is disposed radially outwardly of the pump chamber 18a without overlapping the pump chamber 18a in the radial direction, in other words, without overlapping the pump chamber 18a as seen from the axial direction. More specifically, the resolver 19 is disposed radially outwardly of the pump body 90 without overlapping the pump body 90 in the radial direction, in other words, without overlapping the pump body 90 as seen from the axial direction. In addition, the resolver 19 is disposed radially inwardly of the stator St without overlapping the stator St in the radial direction, in other words, without overlapping the stator St as seen from the axial direction.

In addition, the resolver 19 is disposed to overlap the oil pump 18 (pump case) in the axial direction. In the embodiment, the resolver 19 is disposed to overlap the inner rotor 18b provided in the oil pump 18 in the axial direction. That is, the resolver 19 is disposed to overlap the oil pump 18 (pump case) as seen from the radial direction, more specifically, to overlap the inner rotor 18b provided in the oil pump 18 as seen from the radial direction. As shown in FIG. 3, the resolver 19 is disposed such that the range of the axial position (hereinafter simply referred to as "axial range") in which the coil portion 19c provided in the sensor stator 19a on the other side in the axial direction is located is included in the axial range in which the inner rotor 18b is positioned. In addition, the resolver 19 is disposed such that an end portion of the coil portion 19c provided in the sensor stator 19a on the one side in the axial direction is positioned at an axial position included in the axial range in which the pump body 90 is positioned. Accordingly, in the embodiment, the axial range in which the resolver 19 is positioned is included in the axial range in which the pump body 90 is positioned. In other words, the resolver 19 is disposed to completely overlap the pump body 90 in axial position. Thus, in the embodiment, the resolver 19 is disposed so as to overlap the pump body 90, which is one of the two members forming the pump case (the pump body 90 and the pump cover 91), in the axial direction, but disposed at a different axial position from the pump cover 91, which is the other of the two members, so as not to overlap the pump cover 91. That is, the resolver 19 is disposed so as to overlap the pump body 90 as seen from the radial direction, but disposed at a different axial position from the pump cover 91 so as not to overlap the pump cover 91 as seen from the radial direction. The resolver 19 may be disposed to overlap the pump body 90, which is one of the two members forming the pump case (the pump body 90 and the pump cover 91), in the axial direction, and additionally to overlap the pump cover 91, which is the other of the two members. That is, the resolver 19 may be disposed to overlap both the pump body 90 and the pump cover 91 as seen from the radial direction.

In the embodiment, the resolver 19 is disposed to also overlap the stator St in the axial direction. That is, the resolver 19 is disposed to also overlap the stator St as seen from the radial direction. Specifically, as shown in FIG. 3, the resolver 19 is disposed such that an end portion of the coil portion 19c on the one side in the axial direction, which is provided in the sensor stator 19a on the one side in the axial direction, is positioned at an axial position included in the axial range in which the coil end portion Ce provided in the stator St on the other side in the axial direction is positioned. In addition, the resolver 19 is disposed such that an end portion of the core of the sensor stator 19a on the one side in the axial direction is positioned at an axial position included in the axial range in which the space 73 occupied by the connection terminals provided in the stator St is positioned. Moreover, the resolver 19 is disposed such that the center of the core of the sensor stator 19a in the axial direction is positioned generally at the same axial position as an end portion of the space 73 occupied by the connection terminals provided in the stator St on the other side in the axial direction. Accordingly, in the embodiment, an end portion of the resolver 19 on the other side in the axial direction is positioned on the other side in the axial direction with respect to an end portion of the stator St on the other side in the axial direction. Thus, in the embodiment, the resolver 19 is disposed to overlap the stator St of the rotary electric machine MG in the axial direction, but not to completely overlap the stator St in the axial direction.

With the resolver 19 disposed as described above, the axial length of the space occupied by the resolver 19, the oil pump 18, and the stator St of the rotary electric machine MG can be reduced, which enables the resolver 19 to be disposed appropriately from the viewpoint of reducing the axial dimension of the hybrid drive speed change device 1. In the embodiment, in order to reduce the axial dimension of the hybrid drive speed change device 1, the following arrangement is further adopted. Such an arrangement will be described below.

In the embodiment, as shown in FIG. 2, the one-side radially extending portion 41 forming a part of the clutch housing CH is supported in the axial direction from the one side in the axial direction by the first support wall 4 via the first bearing 51. The first bearing 51 is disposed to overlap the one-side radially extending portion 41 in the axial direction. More specifically, the first bearing 51 is disposed to overlap the radially outer portion of the one-side radially extending portion 41 in the axial direction. That is, the first bearing 51 is disposed to overlap the one-side radially extending portion 41 (specifically, the radially outer portion of the one-side radially extending portion 41) as seen from the radial direction. As a matter of course, the first seal member 61, which is disposed adjacently on the other side in the axial direction with respect to the first bearing 51, is also disposed to overlap the one-side radially extending portion 41 in the axial direction. The first seal member 61 is disposed to overlap the radially inner portion of the one-side radially extending portion 41 in the axial direction. That is, the first seal member 61 is disposed to overlap the one-side radially extending portion 41 (specifically, the radially inner portion of the one-side radially extending portion 41) as seen from the radial direction.

Meanwhile, the other-side radially extending portion 45 forming another part of the clutch housing CH is supported in the axial direction from the other side in the axial direction by the pump body 90 and the case 2, to which the pump body 90 is fixed, via the fourth bearing 54. The fourth bearing 54 is disposed to overlap the other-side radially extending portion 45 in the axial direction. More specifically, the fourth bearing 54 is disposed to overlap the radially outer portion of the other-side radially extending portion 45 in the axial direction. That is, the fourth bearing 54 is disposed to overlap the other-side radially extending portion 45 (specifically, the radially outer portion of the other-side radially extending portion 45) as seen from the radial direction. As a matter of course, the second seal member 62, which is disposed adjacently on the one side in the axial direction with respect to the fourth bearing 54, is also disposed to overlap the other-side radially extending portion 45 in the axial direction. The second seal member 62 is disposed to overlap the radially central portion of the other-side radially extending portion 45 in the axial direction. That is, the second seal member 62 is disposed to overlap the other-side radially extending portion 45 (specifically, the radially central portion of the other-side radially extending portion 45) as seen from the radial direction.

In addition, in the embodiment, as described above, the rotor Ro of the rotary electric machine MG is fixed to the outer peripheral portion of the cylindrical covering portion 49 forming the clutch housing CH to overlap the clutch housing CH in the axial direction, in other words, to overlap the clutch housing CH as seen from the radial direction. Accordingly, the axial dimension of the entire hybrid drive speed change device 1 can be reduced by compactly disposing the clutch housing CH and the clutch mechanism CL, the rotary electric machine MG, and the plurality of bearings 51 and 54 and seal members 61 and 62 housed in the clutch housing CH in the space occupied by the clutch housing CH in the axial direction.

In the embodiment, the first bearing 51, the first seal member 61, the fourth bearing 54, and the second seal member 62 are disposed to overlap each other in the radial direction. The second bearing 52 and the third bearing 53 are disposed to overlap one or two or more of the first bearing 51, the first seal member 61, the fourth bearing 54, and the second seal member 62 in the radial direction in an area between the first bearing 51 and the first seal member 61 and the fourth bearing 54 and the second seal member 62 in the axial direction. The plurality of friction plates 31 of the clutch mechanism CL are disposed radially outwardly of the components mentioned above, namely the first bearing 51, the second bearing 52, the third bearing 53, the fourth bearing 54, the first seal member 61, and the second seal member 62, but also the fifth bearing 55. The plurality of friction plates 31 are disposed to overlap at least the second bearing 52, the third bearing 53, and the second seal member 62 in the axial direction. In the embodiment, further, the second seal member 62, of these components, is disposed to overlap the piston 36 in the axial direction.

Thus, the axial dimension of the entire hybrid drive speed change device 1 can be reduced by compactly disposing all of the starting clutch 10, the rotary electric machine MG, the first bearing 51, the second bearing 52, the third bearing 53, the fourth bearing 54, the fifth bearing 55, the first seal member 61, the second seal member 62, the oil pump 18, and the resolver 19.

4. Other Embodiments

Finally, hybrid drive speed change devices according to other embodiments of the present invention will be described. A characteristic configuration disclosed in each of the following embodiments may be applied not only to that particular embodiment but also in combination with a characteristic configuration disclosed in any other embodiment unless any contradiction occurs.

(1) In the embodiment described above, the pump case which is a member forming the pump chamber 18*a* of the oil pump 18 is formed by the pump body 90 and the pump cover 91 which are separate from the case 2. However, the present invention is not limited thereto. In one preferred embodiment of the present invention, at least a part of a constituent element forming the pump case may form a part of the case 2 (for example, the second support wall 7 or the like).

(2) In the embodiment described above, the sensor stator 19*a* of the resolver 19 is fixed while contacting the outer peripheral surface of the second cylindrical portion 8*b* provided in the axially projecting portion 8. However, the present invention is not limited thereto. The sensor stator 19*a* of the resolver 19 may be fixed to a fixation portion of another configuration provided in the second support wall 7. In the case where the pump body 90 extends to a location radially outwardly of the resolver 19 to overlap the resolver 19 in the radial direction, in other words, to overlap the resolver 19 as seen from the axial direction, a fixation portion (such as a cylindrical portion similar to the second cylindrical portion 8*b*) for fixation of the sensor stator 19*a* to the pump body 90 may be formed so that the sensor stator 19*a* of the resolver 19 is fixed to the fixation portion. Further, in the case where the pump cover 91 has a portion, an end surface of which on the one side in the axial direction is not covered by other members, the sensor stator 19*a* of the resolver 19 may be fixed to such a portion.

(3) In the embodiment described above, the second support wall 7 and the pump case (the pump body 90 and the pump cover 91) cooperate with each other to form the "partition wall" according to the present invention. However, the present invention is not limited thereto. In one preferred embodiment of the present invention, the pump body 90 may be formed to extend to the inner peripheral surface of the case peripheral wall 3, for example, so that the pump case singly forms the "partition wall" according to the present invention.

(4) In the embodiment described above, the second support wall 7 includes the retracted portion 7*a*, and the signal line 74 for the resolver 19 is housed in the retracted portion 7*a* to extend to a location radially outwardly of the resolver 19. However, the present invention is not limited thereto. The second support wall 7 may include no retracted portion 7*a*, and the entirety of the signal line 74 for the resolver 19 may be disposed adjacent to an end surface of the second support wall 7 on the one side in the axial direction for fixation, for example, to be disposed at a position at which the signal line 74 does not overlap the second support wall 7 in the axial direction. In the case where the pump body 90 extends to a location radially outwardly of the resolver 19 to overlap the resolver 19 in the radial direction, in other words, to overlap the resolver 19 as seen from the axial direction, a retracted portion similar to the retracted portion 7*a* may be formed in the pump body 90 so that the signal line 74 is housed in the retracted portion. Further, in the case where the pump cover 91 has a portion, an end surface of which on the one side in the axial direction is not covered by other members, and which overlaps the resolver 19 in the radial direction, that is, overlaps the resolver 19 as seen from the axial direction, a retracted portion may be formed in such a portion to house the signal line 74.

(5) In the embodiment described above, the case 2 includes the second support wall 7 which forms the partition wall, and the resolver 19 is fixed to the second support wall 7. However, the present invention is not limited thereto. In one preferred embodiment of the present invention, the resolver 19 may be fixed to other members forming the partition wall (in the embodiment, the pump body 90 and the pump cover 91). In the case where the space in the first chamber R1 excluding the inside of the clutch housing CH is also not kept in the dry state as with the space in the second chamber R2 and the space in the clutch housing CH, no fourth seal member 64 may be interposed between the outer peripheral surface portion 90*a* and the inner peripheral surface of the second cylindrical portion 8*b* so that a predetermined gap is formed between the outer peripheral surface portion 90*a* and the inner peripheral surface of the second cylindrical portion 8*b*, although the case 2 includes the second support wall 7. In such a case, the case 2 may be configured to include no second support wall 7.

(6) In the embodiment described above, the oil pump 18 is an internal gear pump. However, the present invention is not limited thereto. The oil pump 18 may be an oil pump other than the internal gear pump, such an external gear pump or a vane pump. In such cases, a rotor may be disposed coaxially with the input shaft M in a pump chamber of the oil pump, and the rotor corresponds to the "pump rotor" according to the present invention.

(7) In the embodiment described above, the resolver 19 is an outer-rotor resolver in which the sensor stator 19*a* is provided radially inwardly of the sensor rotor 19*b*. As a matter of course, however, the resolver 19 may be an inner-rotor resolver in which the sensor stator 19*a* is provided radially outwardly of the sensor rotor 19*b*. In the embodiment, in addition, the rotation sensor according to the present invention is a resolver. However, the rotation sensor according to the present invention may be formed by a sensor other than the resolver (a rotation sensor including a Hall element, a magnetoresistive element, or the like).

(8) In the embodiment described above, the resolver 19 is disposed to overlap the inner rotor 18*b* in the axial direction, that is, to overlap the inner rotor 18*b* as seen from the radial direction. However, the present invention is not limited thereto. The resolver 19 may be disposed at a position at which the resolver 19 overlaps the oil pump 18 (pump case) in the axial direction but does not overlap the inner rotor 18*b* in the axial direction. That is, the resolver 19 may be disposed at a position at which the resolver 19 overlaps the oil pump 18 (pump case) as seen from the radial direction but does not overlap the inner rotor 18*b* as seen from the radial direction. For example, the resolver 19 may be disposed to overlap only the pump cover 91 as seen from the radial direction (in the axial direction), or may be disposed to overlap only a portion of the pump body 90 on the one side in the axial direction with respect to an end portion of the inner rotor 18*b* on the one side in the axial direction as seen from the radial direction (in the axial direction).

(9) In the embodiment described above, the resolver 19 is disposed to overlap the stator St of the rotary electric machine MG in the axial direction, that is, to overlap the stator St as seen from the radial direction. However, the present invention is not limited thereto. The resolver 19 may be disposed radially inwardly of the stator St so as not to overlap the stator St in the axial direction. That is, the resolver 19 may be disposed radially inwardly of the stator St at a position at which the resolver 19 does not overlap the stator St as seen from the radial direction.

(10) In the embodiment described above, the input-side member (clutch hub 21) drivably coupled to the internal combustion engine E is disposed radially inwardly of the output-side member (clutch drum 26) drivably coupled to the speed change mechanism TM. However, the present invention is not limited thereto. In one preferred embodiment of the present invention, the input-side member drivably coupled to the internal combustion engine E may be the clutch drum 26, the output-side member drivably coupled to the speed change mechanism TM may be the clutch hub 21, and the output-side member may be disposed radially inwardly of the input-side member.

(11) In the embodiment described above, a recessed portion for forming the pump chamber 18*a* is formed only in the pump body 90. However, a recessed portion for forming the pump chamber 18*a* may be formed in both the pump body 90 and the pump cover 91, or only in the pump cover 91.

(12) In the embodiment described above, of the space formed inside the clutch housing CH, most of the space excluding the working oil chamber 37 serves as the oil circulation chamber 38 which is basically always filled with oil. However, the present invention is not limited thereto. In one preferred embodiment of the present invention, the space in the clutch housing CH excluding the working oil chamber 37 may be formed as a space that is supplied with oil but that is not always filled with oil. In this case, the space in the clutch housing CH excluding the working oil chamber 37 may not necessarily be partitioned oil-tightly.

(13) Also regarding other configurations, the embodiment disclosed herein is illustrative in all respects, and the present invention is not limited thereto. That is, it is a matter of course that a configuration obtained by appropriately altering part of a configuration not disclosed in the claims of the present invention also falls within the technical scope of the present invention as long as the resulting configuration includes a configuration disclosed in the claims or a configuration equivalent thereto.

The present invention may be suitably applied to a hybrid drive speed change device including a friction engagement device having an input-side member drivably coupled an internal combustion engine, an output-side member drivably coupled to a speed change mechanism, and an engagement mechanism that selectively drivably couples the input-side member and the output-side member to each other, the hybrid drive speed change device further including a rotary electric machine having a rotor drivably coupled to the output-side member, a rotation sensor that detects the rotational angle of the rotor, an oil pump, the speed change mechanism, and an input shaft serving as a shaft that drivably couples the speed change mechanism and the output-side member to each other.

The invention claimed is:

1. A hybrid drive speed change device, comprising:
   a friction engagement device having an input-side member drivably coupled to an internal combustion engine, an output-side member drivably coupled to a speed change mechanism, and an engagement mechanism that selectively drivably couples the input-side member and the output-side member to each other;
   a rotary electric machine having a rotor drivably coupled to the output-side member;
   a rotation sensor that detects a rotational angle of the rotor;
   an oil pump that generates a hydraulic pressure for supplying oil to at least one of the speed change mechanism and the friction engagement device;
   the speed change mechanism;
   and an input shaft serving as a shaft that drivably couples the speed change mechanism and the output-side member to each other, wherein
   the rotary electric machine is disposed coaxially with the input shaft, and includes a stator and the rotor provided radially inwardly of the stator,
   the oil pump includes a pump case in which a pump chamber is formed, and a pump rotor rotatably housed in the pump chamber,
   the pump rotor is disposed coaxially with the input shaft, and
   the rotation sensor is disposed radially outwardly of the pump chamber and radially inwardly of the stator of the rotary electric machine, and disposed to overlap the oil pump as seen from a radial direction of the input shaft,
   wherein the rotary electric machine, the oil pump, and the rotation sensor are each disposed coaxially with one another.

2. The hybrid drive speed change device according to claim 1, wherein
   the rotation sensor is disposed to overlap the stator of the rotary electric machine as seen from the radial direction of the input shaft.

3. The hybrid drive speed change device according to claim 1, wherein
   the rotation sensor is disposed to overlap the pump rotor as seen from the radial direction of the input shaft.

4. The hybrid drive speed change device according to claim 1, further comprising:
   a case that houses the friction engagement device, the rotary electric machine, the rotation sensor, the oil pump, and the speed change mechanism, wherein
   the oil pump generates a hydraulic pressure for actuating at least one of an engagement element provided in the speed change mechanism and the friction engagement device,
   a space in the case is partitioned by a partition wall extending in the radial direction and a circumferential direction of the input shaft into a first chamber positioned on one side in an axial direction of the input shaft and a second chamber positioned on the other side in the axial direction,
   the first chamber houses the friction engagement device, the rotary electric machine, and the rotation sensor, and the second chamber houses the speed change mechanism,
   the partition wall includes a member that forms the pump case, and
   a sensor stator of the rotation sensor is fixed to the partition wall.

5. The hybrid drive speed change device according to claim 4, wherein
   the partition wall includes a first member that forms at least a part of the pump case and that has a cylindrical outer peripheral surface portion that is coaxial with the input shaft, and a second member that projects toward the one side in the axial direction of the input shaft and that has a cylindrical portion that is coaxial with the input shaft, the outer peripheral surface portion of the first member and an inner peripheral surface of the cylindrical portion are disposed opposite each other, and a seal member is disposed between the outer peripheral surface portion of the first member and the inner peripheral surface of the cylindrical portion, the sensor stator of the rotation sensor is fixed in contact with an outer peripheral surface of the cylindrical portion, and the sensor rotor of the rotation sensor is disposed radially outwardly of the sensor stator.

6. The hybrid drive speed change device according to claim 1, wherein the rotation sensor includes a sensor rotor and the sensor stator provided radially inwardly of the sensor rotor.

7. The hybrid drive speed change device according to claim 1, further comprising:

a case that houses the friction engagement device, the rotary electric machine, the rotation sensor, the oil pump, and the speed change mechanism, wherein a space in the case is partitioned by a partition wall extending in the radial direction and a circumferential direction of the input shaft into a first chamber positioned on one side in an axial direction of the input shaft and a second chamber positioned on the other side in the axial direction, the first chamber houses the friction engagement device, the rotary electric machine, and the rotation sensor, and the second chamber houses the speed change mechanism, the partition wall includes a member that forms the pump case, and includes a retracted portion that is provided in a region overlapping the rotation sensor as seen from the axial direction of the input shaft and that is retracted toward the other side in the axial direction, and a signal line for bringing a detection signal of the rotation sensor to outside of the case is housed in the retracted portion to extend to a location radially outwardly of the rotation sensor.

8. The hybrid drive speed change device according to claim 7, wherein the partition wall includes a first member that forms at least a part of the pump case and that has a cylindrical outer peripheral surface portion that is coaxial with the input shaft, and a second member that projects toward the one side in the axial direction of the input shaft and that has a cylindrical portion that is coaxial with the input shaft, the outer peripheral surface portion of the first member and an inner peripheral surface of the cylindrical portion are disposed opposite each other, and a seal member is disposed between the outer peripheral surface portion of the first member and the inner peripheral surface of the cylindrical portion, the sensor stator of the rotation sensor is fixed in contact with an outer peripheral surface of the cylindrical portion, and the sensor rotor of the rotation sensor is disposed radially outwardly of the sensor stator.

* * * * *